United States Patent
Wang et al.

(10) Patent No.: US 12,487,304 B2
(45) Date of Patent: Dec. 2, 2025

(54) SIGNAL SATURATION METHOD FOR ACHIEVING SPATIAL SELECTION UNDER NON-UNIFORM FIELD, AND MEDIUM

(71) Applicant: WUXI MARVEL STONE HEALTHCARE CO., LTD., Wuxi (CN)

(72) Inventors: Chao Wang, Chengdu (CN); Hai Luo, Chengdu (CN); Min Wu, Chengdu (CN); Xiao Chen, Chengdu (CN); Ziyue Wu, Chengdu (CN)

(73) Assignee: WUXI MARVEL STONE HEALTHCARE CO., LTD., Wuxi (CN)

( * ) Notice: Subject to any disclaimer, the term of this patent is extended or adjusted under 35 U.S.C. 154(b) by 0 days.

(21) Appl. No.: 19/169,043

(22) Filed: Apr. 3, 2025

(65) Prior Publication Data

US 2025/0258259 A1    Aug. 14, 2025

Related U.S. Application Data

(63) Continuation of application No. PCT/CN2022/130114, filed on Nov. 4, 2022.

(30) Foreign Application Priority Data

Oct. 25, 2022    (CN) .......................... 202211313839.1

(51) Int. Cl.
*G01R 33/387*    (2006.01)
*G01R 33/341*    (2006.01)

(52) U.S. Cl.
CPC ......... *G01R 33/387* (2013.01); *G01R 33/341* (2013.01)

(58) Field of Classification Search
CPC ................ G01R 33/341; G01R 33/387; G01R 33/4828; G01R 33/4838
(Continued)

(56) References Cited

U.S. PATENT DOCUMENTS

| 2004/0056659 A1* | 3/2004 | Kupce | G01R 33/46 324/309 |
| 2012/0019244 A1* | 1/2012 | Chen | G01R 33/5602 324/309 |

(Continued)

FOREIGN PATENT DOCUMENTS

| CN | 103983929 A | 8/2014 |
| CN | 106889988 A | 6/2017 |

(Continued)

*Primary Examiner* — Eman A Alkafawi
*Assistant Examiner* — Rahul Maini
(74) *Attorney, Agent, or Firm* — Bayramoglu Law Offices LLC

(57) ABSTRACT

The provided is a signal saturation method for achieving spatial selection under a non-uniform field, and a medium. The method includes: setting a corresponding magnetization preparation module based on a distance between a target saturation region and a surface coil under a non-uniform field (S1); transmitting, by the surface coil, a first main pulse sequence, or sequentially transmitting a first magnetization preparation module and a first main pulse sequence, to acquire a first echo signal, and storing the first echo signal as a first dataset (S2); sequentially transmitting, by the surface coil, a second magnetization preparation module and a second main pulse sequence to acquire a second echo signal, and storing the second echo signal as a second dataset (S3); and processing the first dataset and the second dataset to saturate a signal in the target saturation region, thereby achieving spatial selection (S4).

14 Claims, 7 Drawing Sheets

(58) Field of Classification Search
USPC .......................................................... 324/309
See application file for complete search history.

(56) References Cited

U.S. PATENT DOCUMENTS

| | | | |
|---|---|---|---|
| 2013/0193969 A1* | 8/2013 | Grunewald | G01V 3/14 |
| | | | 324/309 |
| 2016/0109612 A1 | 4/2016 | Hurlimann et al. | |
| 2016/0202336 A1* | 7/2016 | Liang | G01R 33/561 |
| | | | 324/309 |
| 2017/0307699 A1 | 10/2017 | Rodgers et al. | |

FOREIGN PATENT DOCUMENTS

| | | | | |
|---|---|---|---|---|
| CN | 111157931 A | 5/2020 | | |
| CN | 114167331 A | 3/2022 | | |
| CN | 114200367 A | 3/2022 | | |
| CN | 114236442 A | 3/2022 | | |
| WO | WO-2021158929 A1 * | 8/2021 | ........... | G01R 33/448 |

* cited by examiner

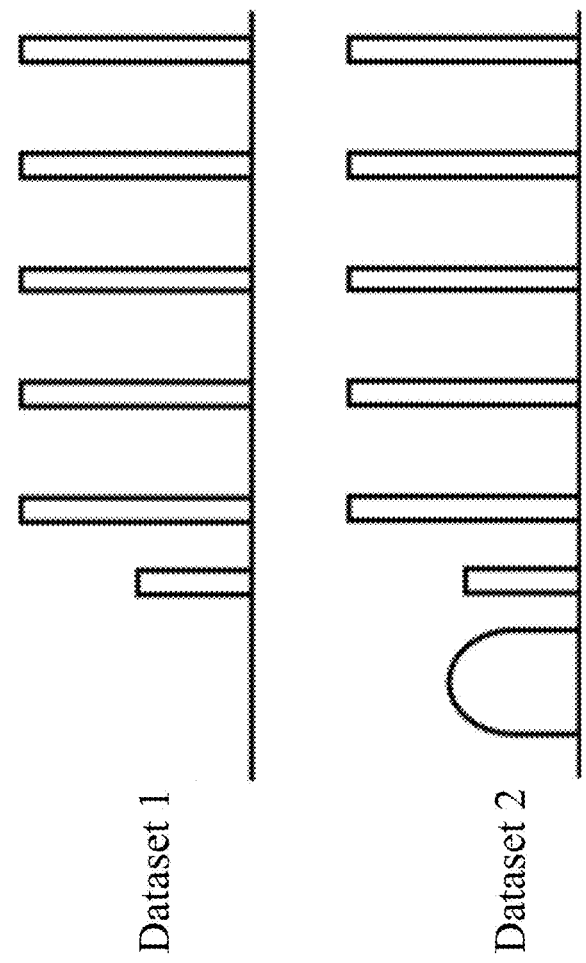

SIGNAL SATURATION METHOD FOR ACHIEVING SPATIAL SELECTION UNDER NON-UNIFORM FIELD, AND MEDIUM

CROSS-REFERENCE TO THE RELATED APPLICATIONS

This application is a continuation application of International Application No. PCT/CN2022/130114, filed on Nov. 4, 2022, which is based upon and claims priority to Chinese Patent Application No. 202211313839.1, filed on Oct. 25, 2022, the entire contents of which are incorporated herein by reference.

TECHNICAL FIELD

The present disclosure belongs to the technical field of magnetic resonance (MR), and in particular relates to a signal saturation method for achieving spatial selection under a non-uniform field, and a medium.

BACKGROUND

Spatially selective signal saturation has broad applications in magnetic resonance (MR). For instance, it is frequently employed in brain imaging to suppress arterial/venous blood signals, thereby reducing pulsation artifacts, and to label arterial blood signals in arterial spin labeling (ASL). A conventional MR device utilizes a combination of gradient pulses and saturation radio frequency (RF) pulses to achieve spatially selective signal saturation. Gradient pulses induce a linear variation in the resonance frequencies of spins at different spatial positions, while the frequency selectivity of saturation RF pulses ensures that they can only effectively act on spins within a specific frequency range. Therefore, saturation of this part of signal can be achieved by combining gradient pulses with saturation RF pulses.

However, the situation under non-uniform fields differs significantly from the above. First, non-uniform fields, such as those generated by unilateral magnets, exhibit highly non-uniform spatial distributions. Generally, the magnetic field intensity decreases with increasing distance from the magnet surface. Thus, the non-uniformity of the magnetic field can be approximately described by magnetic field gradients, but it is important to note that the magnetic field gradients are also related to spatial positions. For example, FIG. 1A illustrates the magnetic field distribution of a unilateral magnet along a direction perpendicular to the surface depth direction of the magnet. It can be seen that the magnetic field intensity varies substantially across spatial positions, leading to significant differences in the resonance frequencies of spins at different spatial positions. Additionally, surface coils are commonly used as transmit coils in non-uniform fields, and their transmit fields exhibit pronounced non-uniformity. Generally, the RF field intensity diminishes with increasing distance from the surface coil. FIG. 1B demonstrates the transmit field distribution of a surface coil along a direction perpendicular to the surface depth direction of the coil. It can be seen that the RF field intensity varies markedly across spatial positions. In nuclear magnetic resonance (NMR), under the action of an RF field, the macroscopic magnetization vector of spins rotates about the effective field, whose direction depends on both the resonance frequency of the spin and the RF field intensity. Therefore, in non-uniform fields, both the static magnetic field B0 and the RF field B1 perpendicular to the static magnetic field B0 exhibit significant non-uniformity. Consequently, the directions of the effective field differ across spatial positions, rendering conventional RF pulses incapable of flipping spins to their nominal flip angles.

In practical application, while signal saturation effects from conventional RF pulses can still be observed under non-uniform fields, they do not constitute true signal saturation in essence. Instead, they arise from the cancellation of signals due to spins at different spatial positions being flipped to varying angles under a specific RF intensity. This signal saturation method demonstrates high sensitivity to the non-uniformity of the main magnetic field, the RF pulse intensity, and the size and position of the saturation region, making it impractical for actual use.

SUMMARY

An objective of the present disclosure is to provide a signal saturation method for achieving spatial selection under a non-uniform field, and a medium. The present disclosure solves the technical problem that the signal saturation method in the prior art demonstrates high sensitivity to the non-uniformity of the main magnetic field, the radio frequency (RF) pulse intensity, and the size and position of the saturation region, making it impractical for actual use.

To achieve the above objective, the present disclosure adopts the following technical solutions:

A first aspect provides a signal saturation method for achieving spatial selection under a non-uniform field, including:
  setting a corresponding magnetization preparation module based on a distance between a target saturation region and a surface coil under a non-uniform field;
  transmitting, by the surface coil, a first main pulse sequence, or sequentially transmitting a first magnetization preparation module and a first main pulse sequence, to acquire a first echo signal, and storing the first echo signal as a first dataset;
  sequentially transmitting, by the surface coil, a second magnetization preparation module and a second main pulse sequence to acquire a second echo signal, and storing the second echo signal as a second dataset; and
  processing the first dataset and the second dataset to saturate a signal in the target saturation region, thereby achieving spatial selection.

In a possible design, when transmitting, by the surface coil, a first main pulse sequence, or sequentially transmitting a first magnetization preparation module and a first main pulse sequence, the method further includes:
  performing phase cycling on the first main pulse sequence or on the first magnetization preparation module and the first main pulse sequence, to eliminate an effect of a ring-down signal during an echo process and residual transverse magnetization subsequent to the first magnetization preparation module on the first echo signal.

In a possible design, when sequentially transmitting, by the surface coil, a second magnetization preparation module and a second main pulse sequence, the method further includes:
  performing phase cycling on the second magnetization preparation module and the second main pulse sequence, to eliminate an effect of a ring-down signal during an echo process and residual transverse magnetization subsequent to the second magnetization preparation module on the second echo signal.

In a possible design, the surface coil includes a main transmit coil and/or a secondary transmit coil; and the surface coil is configured to synchronously or asynchronously transmit the magnetization preparation module through the main transmit coil and/or the secondary transmit coil.

In a possible design, the magnetization preparation module includes at least one adiabatic pulse.

In a possible design, the adiabatic pulse is a 180° adiabatic pulse; and the 180° adiabatic pulse includes a hyperbolic secant (sech) adiabatic pulse or a wideband, uniform rate, smooth truncation (WURST) adiabatic pulse.

In a possible design, the processing the first dataset and the second dataset to saturate a signal in the target saturation region, thereby achieving spatial selection includes:

performing, according to a corresponding synthetic calculation equation, data synthetic calculation on the first dataset and the second dataset to saturate the signal in the target saturation region, thereby achieving spatial selection, where the synthetic calculation equation at least includes:

$$S_{sync} = wS_1 + S_2, \text{ or} \quad (5)$$

$$S_{sync} = wS_1 - S_2 \quad (6)$$

where, $S_{sync}$ denotes synthesized data; $S_1$ denotes the first dataset; $S_2$ denotes the second dataset; and W denotes a weighting coefficient.

In a possible design, the weighting coefficient W is obtained by:

placing a phantom with a same thickness as the target saturation region in the target saturation region as an experimental subject;

scanning the experimental subject separately through the first main pulse sequence, the first magnetization preparation module and the first main pulse sequence, and the second magnetization preparation module and the second main pulse sequence to obtain a first test set and a second test set; and calculating, based on the first test set and the second test set, the weighting coefficient W as follows:

$$\min_w wS'_1 + S'_2 \quad (7)$$

where, $S'_1$ denotes the first test set; and $S'_2$ denotes the second test set.

A second aspect provides a signal saturation device for achieving spatial selection under a non-uniform field, including:

a magnetization preparation module setting module, configured to set a corresponding magnetization preparation module based on a distance between a target saturation region and a surface coil under a non-uniform field;

a first dataset acquisition module, configured to transmit, by the surface coil, a first main pulse sequence, or sequentially transmit a first magnetization preparation module and a first main pulse sequence, to acquire a first echo signal, and store the first echo signal as a first dataset;

a second dataset acquisition module, configured to sequentially transmit, by the surface coil, a second magnetization preparation module and a second main pulse sequence to acquire a second echo signal, and store the second echo signal as a second dataset; and a signal saturation module, configured to process the first dataset and the second dataset to saturate a signal in the target saturation region, thereby achieving spatial selection.

A third aspect provides a storage medium, where the storage medium is configured to store an instruction; and the instruction is run on a computer to implement the signal saturation method for achieving spatial selection under a non-uniform field in any possible design of the first aspect.

A fourth aspect of the present disclosure provides a computer device, including a memory, a processor, and a transceiver that are sequentially connected in communication, where the memory is configured to store a computer program; the transceiver is configured to transmit and receive messages; and the processor is configured to read the computer program so as to implement the signal saturation method for achieving spatial selection under a non-uniform field in any possible design of the first aspect.

Compared with the prior art, the present disclosure has the following beneficial effects:

In the present disclosure, a corresponding magnetization preparation module is set based on the non-uniformity of an RF field of a surface coil and a distance between a target saturation region and the surface coil. Based on the effect of the magnetization preparation module on the signal acquisition of a main sequence, a first dataset is acquired by transmitting a first main pulse sequence or sequentially transmitting a first magnetization preparation module and the first main pulse sequence. A second dataset is acquired by sequentially transmitting a second magnetization preparation module and a second main pulse sequence. Thus, there are spatially correlated differences in signal components included in the first dataset and the second dataset acquired. During reconstruction, the first dataset and the second dataset are processed to selectively saturate signals within a certain spatial range. Compared to the prior art, the present disclosure demonstrates insensitivity to the non-uniformity of the main magnetic field, the RF field intensity, and the size and position change of the saturation region. Therefore, the present disclosure is more convenient in practical applications and can achieve a more stable and accurate signal saturation effect.

BRIEF DESCRIPTION OF THE DRAWINGS

FIG. 5 is a schematic diagram of a sequence according to an application example of the present disclosure.

DETAILED DESCRIPTION OF THE EMBODIMENTS

Figure 1B:
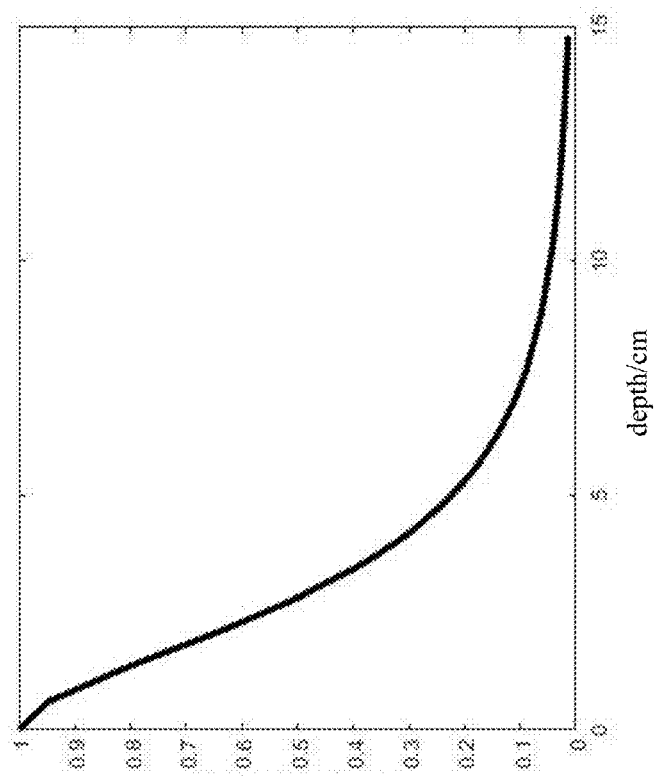
FIG. 1B is a schematic diagram of a transmit field distribution of a surface coil along a direction perpendicular to a surface depth direction of the coil.
Figure 1A:
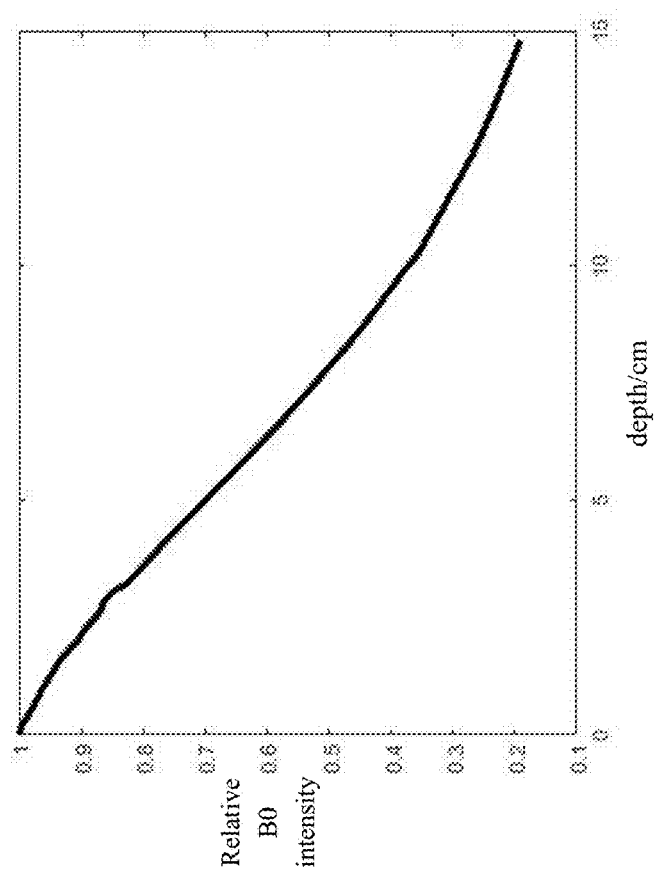
FIG. 1A is a schematic diagram of a magnetic field distribution of a unilateral magnet along a direction perpendicular to a surface depth direction of the magnet.
Figure 2:
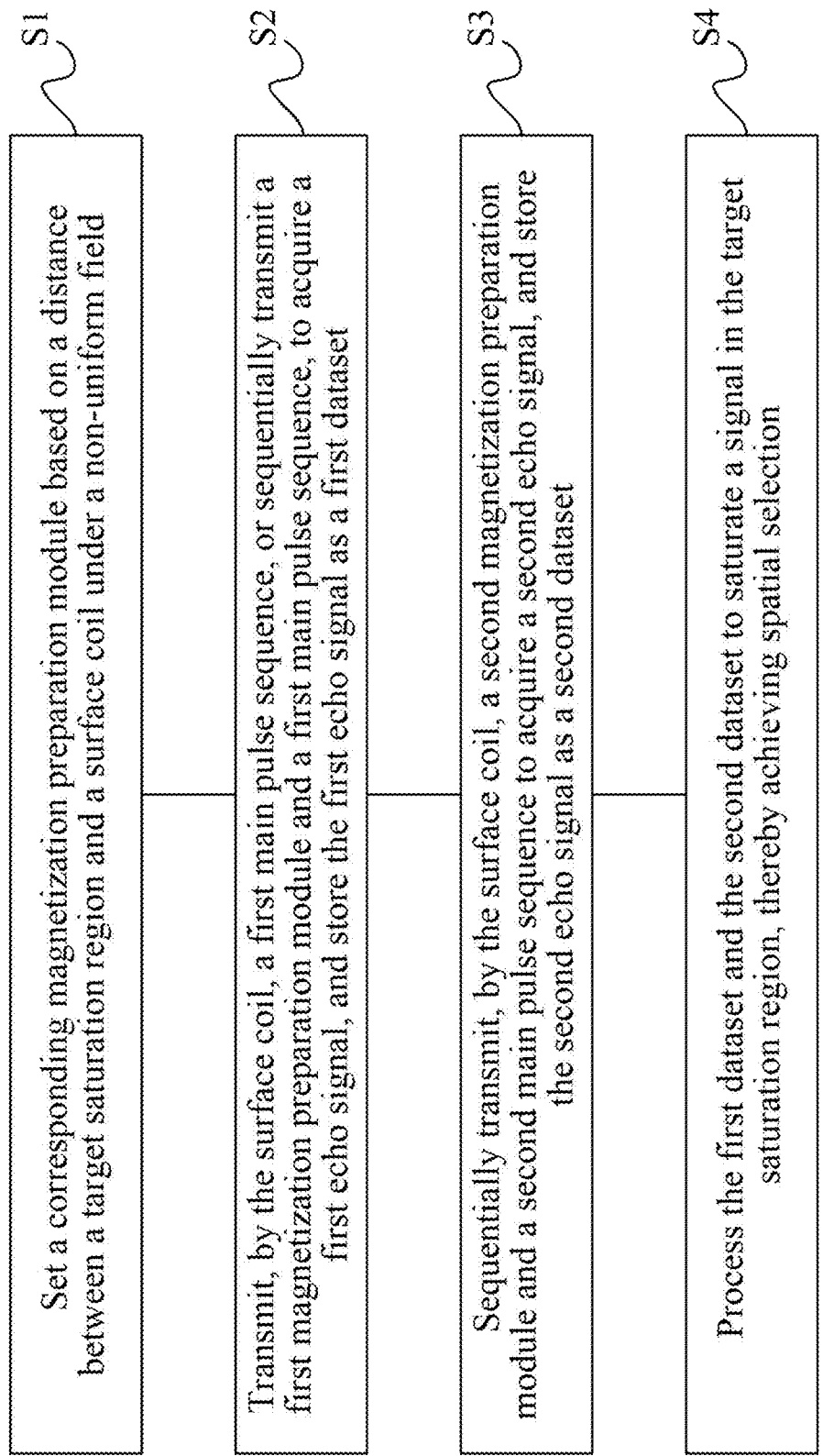
FIG. 2 is a flowchart of a signal saturation method for achieving spatial selection under a non-uniform field according to an embodiment of the present disclosure.

To describe the technical solutions in the embodiments of the present disclosure or in the prior art more clearly, the present disclosure is described simply with reference to the accompanying drawings and the embodiments or descriptions in the prior art. Apparently, the accompanying drawings in the following description show merely some embodiments of the present disclosure, and those skilled in the art may still derive other drawings from these accompanying drawings without creative efforts. It should be noted here that the description of these embodiments is intended to help understand the present disclosure, rather than to constitute a limitation to the present disclosure.

Embodiment

The present disclosure aims to solve the technical problem that the signal saturation method in the prior art demonstrates high sensitivity to the non-uniformity of the main magnetic field, the RF pulse intensity, and the size and position of the saturation region, making it impractical for actual use. To this end, the embodiment of the present disclosure proposes a signal saturation method for achieving spatial selection under a non-uniform field. In this method, a corresponding magnetization preparation module is set based on the non-uniformity of an RF field of a surface coil and a distance between a target saturation region and the surface coil. Based on the effect of the magnetization preparation module on the signal acquisition of a main sequence, a first dataset is acquired by transmitting a first main pulse sequence or sequentially transmitting a first magnetization preparation module and the first main pulse sequence. A second dataset is acquired by sequentially transmitting a second magnetization preparation module and a second main pulse sequence. Thus, there are spatially correlated differences in signal components included in the first dataset and the second dataset acquired. During reconstruction, the first dataset and the second dataset are processed to selectively saturate signals within a certain spatial range. Compared to the prior art, the present disclosure demonstrates insensitivity to the non-uniformity of the main magnetic field, the RF field intensity, and the size and position change of the saturation region. Therefore, the present disclosure is more convenient in practical applications and can achieve a more stable and accurate signal saturation effect.

The signal saturation method for achieving spatial selection under a non-uniform field provided by the embodiment of the present disclosure is described in detail below.

As shown in FIGS. 2-3, 4A-4B, and 5-6, the signal saturation method for achieving spatial selection under a non-uniform field provided by the embodiment of the present disclosure includes but is not limited to steps S1 to S4.

A first aspect provides a signal saturation method for achieving spatial selection under a non-uniform field, including the following steps.

Step S1. Under a non-uniform field, a corresponding magnetization preparation module is set based on a distance between a target saturation region and a surface coil.

Preferably, in the embodiment of the present disclosure, the magnetization preparation module includes at least one adiabatic pulse. More preferably, the adiabatic pulse is a 180° adiabatic pulse. The 180° adiabatic pulse includes a hyperbolic secant (sech) adiabatic pulse or a wideband, uniform rate, smooth truncation (WURST) adiabatic pulse. The number and transmission method of adiabatic pulses vary depending on the distance between the target saturation region and the surface coil. The specific settings are based on actual application requirements and are not limited here.

It should be noted that the adiabatic pulse refers to a type of RF pulse in MR that has both frequency/phase modulation and amplitude modulation. Under the action of the adiabatic pulse, the direction of the effective field continuously changes during the pulse period. When the rate of change satisfies an adiabatic condition, the magnetization vector formed by a spin always follows the direction of the effective field, so its flip angle depends on the final direction of the effective field of the pulse. In practical applications, as long as the RF field intensity reaches a certain threshold, the adiabatic condition can be satisfied, and the flip angle of the pulse in this interval is independent of the RF field intensity B1. Therefore, it can be determined that the adiabatic pulse demonstrates insensitivity to the non-uniformity of the field B1. By utilizing this property of the adiabatic pulse, conventional MR can flip fat to the same angle when the field B1 is non-uniform, thereby enhancing the fat suppression effect.

Figure 3:
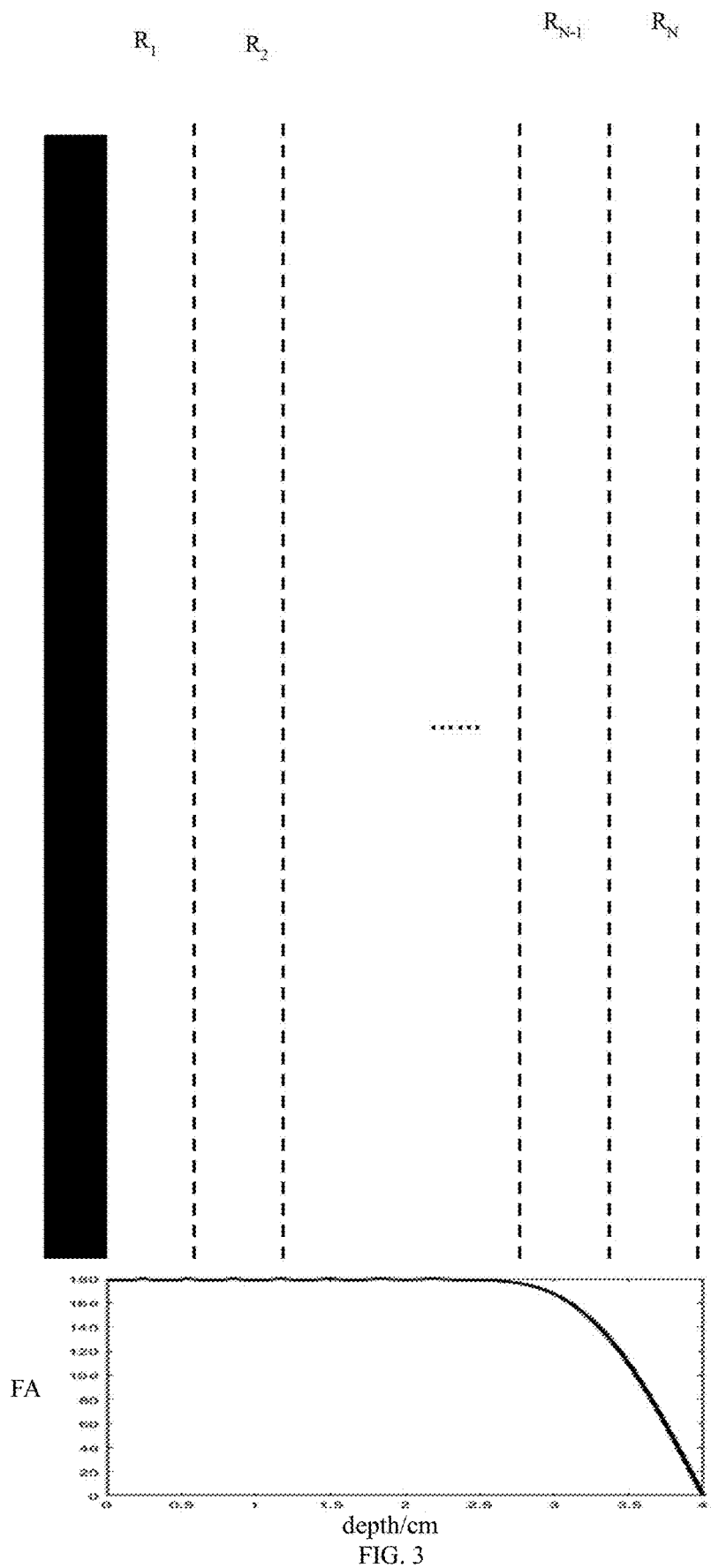
FIG. 3 is a schematic diagram of a flip angle distribution of the non-uniform field under the action of an adiabatic pulse module according to the embodiment of the present disclosure.

However, the situation under non-uniform fields is different from the above. As mentioned earlier, surface coils are commonly used as excitation coils in non-uniform fields, and their RF fields have a high degree of non-uniformity, far exceeding the non-uniformity of the field B1 that may exist in conventional MR. As the distance from the surface coil increases, the RF field intensity gradually decreases, and the adiabatic condition becomes increasingly unsatisfactory. This property gives the flip angle of the adiabatic pulse a spatial distribution (mainly in the depth direction), as shown in FIG. 3. The figure shows the flip angle distribution corresponding to magnetic field regions with different distances from the depth direction of the surface coil. From the figure, it can be seen that the relationship between the flip angle and spatial position of the adiabatic pulse can be approximately expressed as follows. The flip angle at a closer position is defined as a nominal angle of the pulse (such as a 180° pulse, where the flip angle reaches 180° at a closer position). As the distance increases, the flip angle decreases and eventually becomes 0. Based on the above property of the adiabatic pulse, a corresponding adiabatic pulse module is set according to the positions of the target saturation region and the surface coil so as to achieve subsequent spatial selection.

It should be noted that in order to avoid the effect of the non-uniformity of the field B0, the adiabatic pulse needs to have sufficient bandwidth in the B0 direction. Generally speaking, a 90° adiabatic pulse demonstrates high sensitivity to B0 non-uniformity and is hard to meet this condition. Therefore, in the embodiment of the present disclosure, it is preferred that the adiabatic pulse is a 180° adiabatic pulse. More preferably, there are multiple possible forms of 180° adiabatic pulses, such as sech adiabatic pulses or WURST adiabatic pulses. Of course, it can be understood that in this embodiment, the 180° adiabatic pulse is not limited to the above pulse form. Other forms of 180° adiabatic pulses are also within the protection range of this embodiment and are not limited here.

Based on the above description, by using a 180° adiabatic pulse in a non-uniform field, the flip angle is set to 180° within a sufficiently wide frequency offset range close to the surface coil. As the distance from the surface coil increases, the flip angle gradually decreases and eventually becomes 0°. Based on the relationship between the flip angle and spatial position, a corresponding sequence can be designed to selectively saturate the signal in a region at a certain distance from the surface coil in space.

In a specific implementation of the step S1, the surface coil includes a main transmit coil and/or a secondary transmit coil, and the surface coil is configured to synchronously or asynchronously transmit the magnetization preparation module through the main transmit coil and/or the secondary transmit coil. More preferably, the surface coil transmits multiple adiabatic pulses synchronously or asynchronously through the main transmit coil and/or the secondary transmit coil. That is, all adiabatic pulses are transmitted through the main transmit coil, all adiabatic pulses are transmitted through the secondary transmit coil, or multiple adiabatic pulses are synchronously transmitted through the main transmit coil and the secondary transmit coil, or multiple adiabatic pulses are asynchronously transmitted through the main transmit coil and the secondary transmit coil, etc. The specific settings can be customized according to the actual application scenario, and are not limited here.

Step S2. The surface coil transmits a first main pulse sequence, or sequentially transmits the first magnetization preparation module and the first main pulse sequence, to acquire a first echo signal, and stores the first echo signal as a first dataset.

In a specific implementation of the step S2, in order to reduce the effect of interference signals on the first echo signal during the echo process, when the surface coil transmits the first main pulse sequence or sequentially transmits the first magnetization preparation module and the first main pulse sequence, the method further includes the following step.

Phase cycling is performed on the first main pulse sequence or on the first magnetization preparation module and the first main pulse sequence, to eliminate an effect of a ring-down signal during the echo process and residual transverse magnetization subsequent to the first magnetization preparation module on the first echo signal.

Figure 4A:
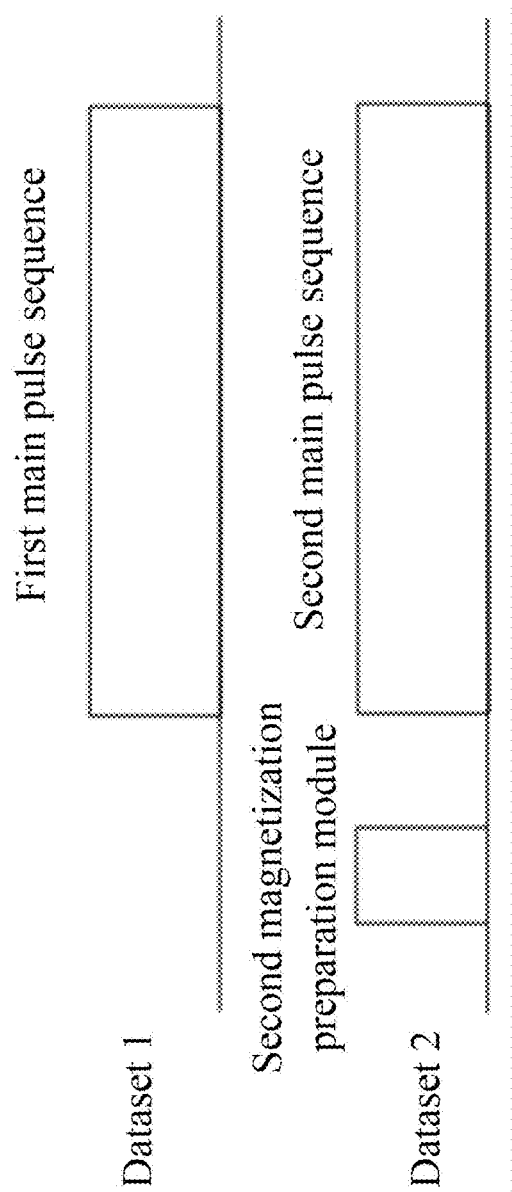
FIG. 4A is a schematic diagram of a sequence according to the embodiment of the present disclosure.
Figure 4B:
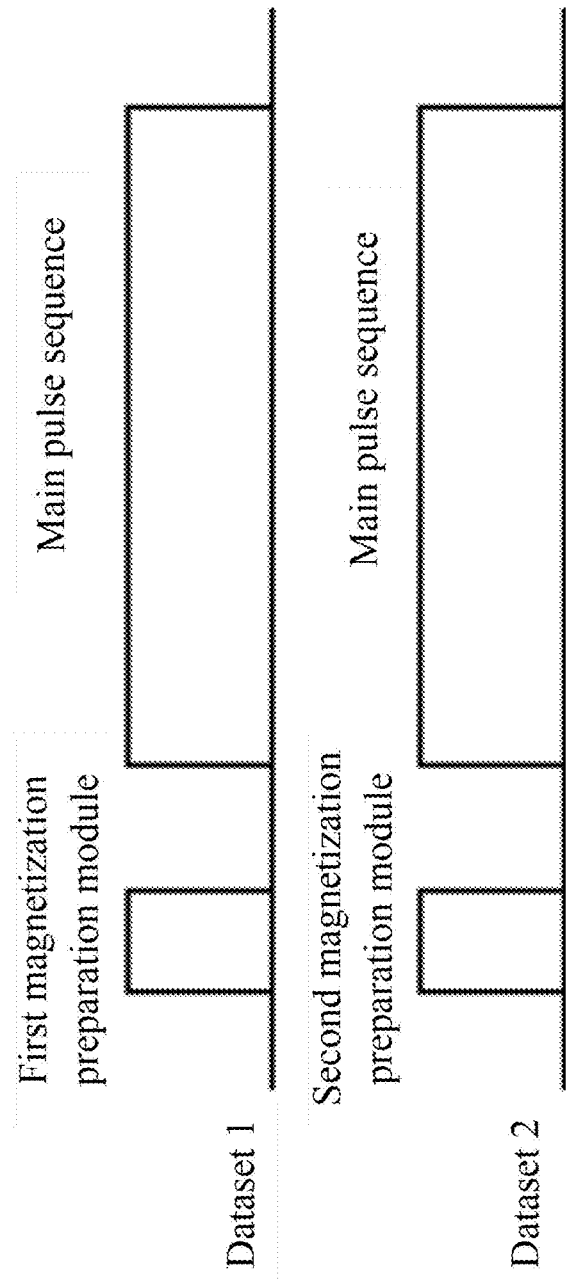
FIG. 4B is a schematic diagram of another sequence according to the embodiment of the present disclosure.

Step S3. The surface coil sequentially transmits a second magnetization preparation module and a second main pulse sequence to acquire a second echo signal, and stores the second echo signal as a second dataset. The steps are shown in FIGS. 4A and 4B.

It should be noted that in this embodiment, the main pulse sequence refers to a main sequence module that includes RF pulse excitation and data acquisition. Preferably, the main pulse sequence is a Carr-Purcell-Meiboom-Gill sequence (CPMG) or spin echo (SE)-Diffusion pulse sequence. Of course, it can be understood that the main pulse sequence in this embodiment is not limited to the above example. Existing known main pulse sequences are within the protection scope of this embodiment and are not limited here. Preferably, the entire scanning process is divided into two parts. In one part, data are acquired under the action of the first main pulse sequence or under the joint action of the first magnetization preparation module and the first main pulse sequence to form the first dataset. In the other part, data are acquired under the joint action of the second magnetization preparation module and the second main pulse sequence to form the second dataset.

It should be noted that there may still be a residual transverse magnetization vector after the adiabatic pulse, and this signal may be mixed into the signal acquired by the main pulse sequence. In order to eliminate the effect of this part of signal, this embodiment adopts phase cycling. Specifically, when the surface coil sequentially transmits the first magnetization preparation module and the first main pulse sequence or sequentially transmits the second magnetization preparation module and the second main pulse sequence, the method further includes the following step.

Phase cycling is performed on the first magnetization preparation module and the first main pulse sequence or on the second magnetization preparation module and the second main pulse sequence, to eliminate an effect of a ring-down signal during the echo process and residual transverse magnetization subsequent to the second magnetization preparation module on the second echo signal.

Preferably, in this embodiment, when phase cycling is performed on the first main pulse sequence, on the first magnetization preparation module and the first main pulse sequence, or on the second magnetization preparation module and the second main pulse sequence, parameters in the following phase cycling table can be used.

TABLE 1

| \multicolumn{4}{c}{Phase cycling table} | | | |
|---|---|---|---|
| Adiabatic pulse phase | 90° pulse phase | 180° pulse phase | Receive phase |
| 0 | 180 | 270 | 180 |
| 0 | 0 | 90 | 0 |
| 180 | 180 | 90 | 180 |
| 180 | 0 | 270 | 0 |

Step S4. The first dataset and the second dataset are processed to saturate a signal in the target saturation region, thereby achieving spatial selection.

Preferably, before the first dataset and the second dataset are processed, the method further includes the following step.

Based on an effect of the first magnetization preparation module on a signal component of the first dataset, the first dataset is calculated as follows:

$$S_1 = \sum_{i=1}^{N} \alpha_{1i} s_i \quad (1)$$

$$\alpha_{1i} = \cos(FA_{1i}) \quad (2)$$

where, $S_1$ denotes the first dataset; i denotes an i-th region of a tested object in the depth direction of the surface coil; N denotes a total number of regions; $\alpha_{1i}$ denotes a flip efficiency of the first magnetization preparation module on a signal in the i-th region; $S_i$ denotes a signal generated by a magnetization vector in the i-th region; and $FA_{1i}$ denotes a flip angle experienced by the magnetization in the i-th region after the application of the first magnetization preparation module.

Of course, it can be understood that when only the first main pulse sequence is applied to acquire the first dataset, the value of $\alpha_{1i}$ is 1 due to the lack of the first magnetization preparation module affecting the signal of the first dataset.

Based on an effect of the second magnetization preparation module on a signal component of the second dataset, the second dataset is calculated as follows:

$$S_2 = \sum_{i=1}^{N} \alpha_{2i} s_i \qquad (3)$$

$$\alpha_{2i} = \cos(FA_{2i}) \qquad (4)$$

where, S2 denotes the second dataset; $\alpha_{2i}$ denotes a flip efficiency of the second magnetization preparation module on the signal in the i-th region; $FA_{2i}$ denotes a flip angle experienced by the magnetization in the i-th region after the application of the second magnetization preparation module.

In a specific implementation of the step S4, the first dataset and the second dataset are processed to saturate a signal in the target saturation region, thereby achieving spatial selection. This step is implemented as follows.

According to a corresponding synthetic calculation equation, data synthetic calculation is performed on the first dataset and the second dataset to saturate the signal in the target saturation region, thereby achieving spatial selection. The synthetic calculation equation at least includes:

$$S_{sync} = wS_1 + S_2, \text{ or} \qquad (5)$$

$$S_{sync} = wS_1 - S_2 \qquad (6)$$

where, $S_{sync}$ denotes synthesized data; $S_1$ denotes the first dataset; $S_2$ denotes the second dataset; and W denotes a weighting coefficient.

For example, the first dataset is only acquired by scanning with the first main pulse sequence, and the second dataset is acquired by a 180° adiabatic pulse and the second main pulse sequence. In this case, if the 180° adiabatic pulse is completely flipped, the value of $\alpha_i$ is −1, and if it is not completely flipped, the value of $\alpha_i$ is 1. When the first dataset and the second dataset are synthesized through summation, signals within a proximal region are canceled out, thereby saturating the signals in the proximal region. Conversely, when the first dataset and the second dataset are synthesized through subtraction, signals in a distal region are canceled out, thereby saturating the signals in the distal region. Of course, it can be understood that when the adiabatic pulse module includes multiple adiabatic pulses, the transmit coils of the adiabatic pulses can have more complex combinations between the main coil and the secondary coil, thereby achieving more flexible saturation region selection, which is not limited to the above data processing form.

In a specific implementation of the step S4, the weighting coefficient W is obtained as follows:

A phantom with a same thickness as the target saturation region is placed in the target saturation region as an experimental subject. For example, to saturate a body surface signal in a region with a thickness of 3 cm, the thickness of the phantom is set to 3 cm. If the target saturation region is a proximal region within 3 cm of a coil surface, the phantom is placed next to the coil surface.

The experimental subject is scanned separately through the first main pulse sequence, the first magnetization preparation module and the first main pulse sequence, and the second magnetization preparation module and the second main pulse sequence to obtain a first test set and a second test set.

It should be noted that the method of scanning the experimental subject through the first main pulse sequence, the first magnetization preparation module and the first main pulse sequence, and the second magnetization preparation module and the second main pulse sequence is the same as the principle of the steps S2 and S3, and will not be repeated here.

The weighting coefficient W is calculated based on the first test set and the second test set as follows:

$$\min_w wS'_1 + S'_2 \qquad (7)$$

where, $S'_1$ denotes the first test set; and $S'_2$ denotes the second test set.

Figure 6:
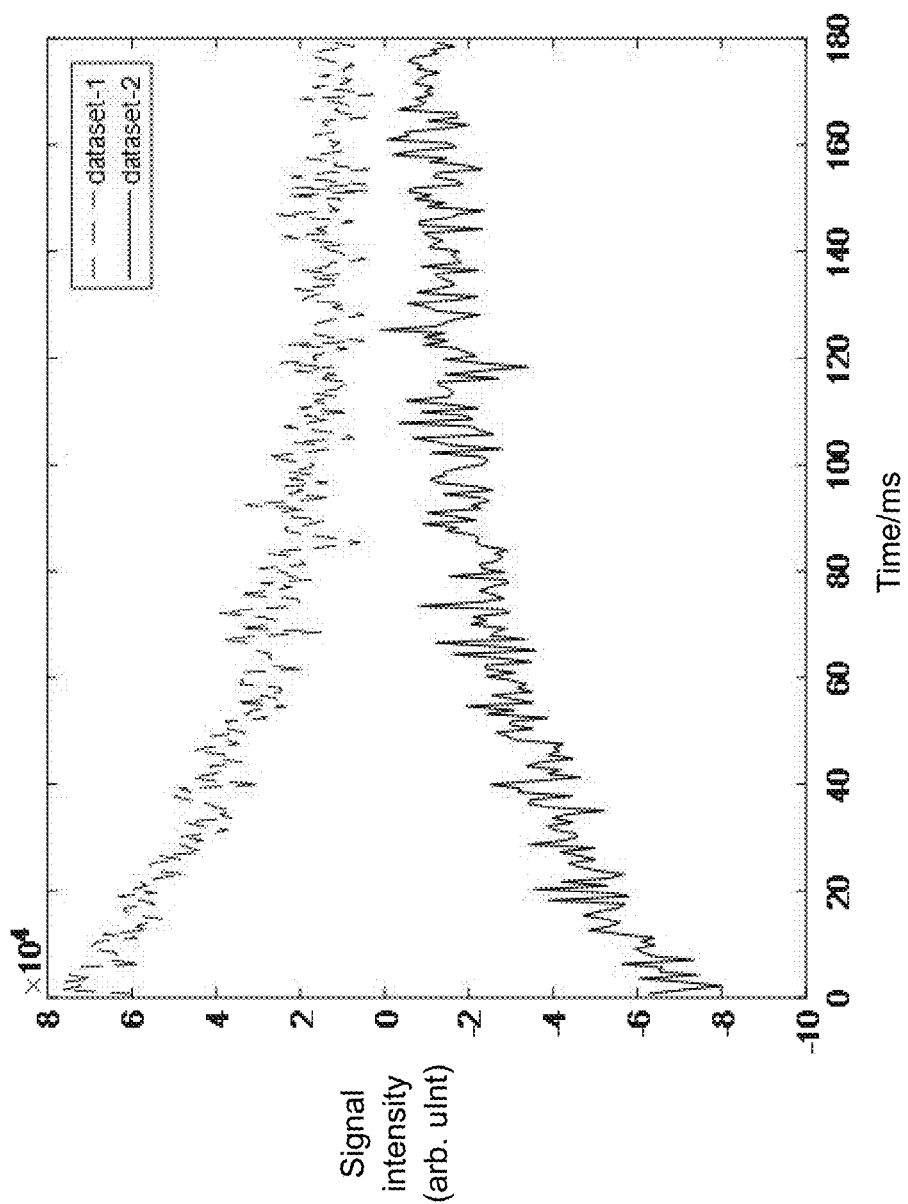
FIG. 6 is a diagram showing a signal curve acquired in a process of determining a weighting coefficient according to the embodiment of the present disclosure.

For example, to saturate a signal within 3 cm of the coil, the thickness of the phantom is set to 3 cm, and the phantom is placed next to the coil. As mentioned earlier, the signals of the first test set and the second test set are acquired separately, and the results are shown in FIG. 6. It can be seen that the second magnetization preparation module basically achieves complete flipping of the signal in the saturation region. In this embodiment, the weighting coefficient W is ultimately determined to be 0.953 according to Eq. (7).

Based on the content disclosed above, in the embodiment of the present disclosure, a corresponding magnetization preparation module is set based on the non-uniformity of an RF field of a surface coil and a distance between a target saturation region and the surface coil. Based on the effect of the magnetization preparation module on the signal acquisition of a main sequence, a first dataset is acquired by transmitting a first main pulse sequence or sequentially transmitting a first magnetization preparation module and the first main pulse sequence. A second dataset is acquired by sequentially transmitting a second magnetization preparation module and a second main pulse sequence. Thus, there are spatially correlated differences in signal components included in the first dataset and the second dataset acquired. During reconstruction, the first dataset and the second dataset are processed to selectively saturate signals within a certain spatial range. Compared to the prior art, the present disclosure demonstrates insensitivity to the non-uniformity of the main magnetic field, the RF field intensity, and the size and position change of the saturation region. Therefore, the present disclosure is more convenient in practical applications and can achieve a more stable and accurate signal saturation effect.

Application Example

In order to gain a deeper understanding of the signal saturation method for achieving spatial selection under a non-uniform field in this embodiment, this method is described in detail below through a specific application scenario, namely liver fat quantification in a uniform field. When measuring a liver fat content, a target testing region is 5-8 cm deep from a body surface. However, due to the distribution of a non-uniform field, the region selected by controlling the pulse modulation frequency actually includes not only the target testing region, but also a portion of a body surface region. Due to the presence of a large amount of subcutaneous fat in the signal of the body surface region, the measurement result may be overestimated. The signal saturation method for achieving spatial selection under a non-uniform field in this embodiment can greatly suppress the body surface signal and improve the accuracy of the result.

The liver fat quantification sequence of the method in this embodiment is shown in FIG. 5. Preferably, the secondary transmit coil transmits the adiabatic pulse, while the main transmit coil transmits the subsequent main sequence module, namely the CPMG sequence. The design size of the secondary transmit coil here is smaller, and the transmit field of the secondary transmit coil is more focused in the proximity of the body surface, which is more conducive to saturating the body surface signal and reducing the effect on signals in a deeper region.

To measure the fat content parameter, the above sequence needs to perform repeated scans for multiple times with varying repletion times (TR)/echo times (TE), and finally a proton density fat fraction (PDFF) is calculated through data processing, specifically as follows.

Step 1). The secondary coil does not transmit the adiabatic pulse, while the main coil transmits the CPMG sequence. A CPMG echo signal is acquired and stored as dataset 1, denoted as S1 (frame,avg), where frame indicates which TR/TE combination a current scan involves, and avg indicates which signal averaging in a current frame of the dataset 1 the current scan involves.

Step 2). CPMG phase cycling is performed, and the step 1) is repeated several times, preferably 2 or 4 times, to eliminate the effect of a ring-down signal on the echo signal.

Step 3). The secondary coil transmits an adiabatic pulse, while the main coil transmits a CPMG sequence. A CPMG echo signal is acquired and stored as dataset 2, denoted as S2 (frame,avg).

Step 4). CPMG phase cycling is performed, and the step 3) is repeated several times, preferably 2 or 4 times, to eliminate the effect of a ring-down signal on the echo signal.

Step 5). The steps 1) to 4) are repeated until a set number of averaging is reached.

Step 6). TR/TE is changed and the steps 1) to 5) are repeated until scans of all TR/TE combinations are completed, thereby ending the current process.

After scanning is completed, data processing is performed as follows.

Step 7). Data averaging is performed on the dataset 1 and the dataset 2 separately, and the averaged dataset 1 and dataset 2 are denoted as S1 and S2, respectively.

Step 8). The dataset 1 and the dataset 2 are subjected to synthetic calculation as follows:

$$S_{sync} = wS_1 + S_2.$$

From the above, it can be seen that the synthesized signal $S_{sync}$ saturates the body surface signal, eliminating the effect of body surface signal on the signal in target region.

Step 9). Based on the synthesized signal $S_{sync}$, the PDFF is calculated according to an existing algorithmic equation, which will not be elaborated here.

A second aspect provides a signal saturation device for achieving spatial selection under a non-uniform field, including: a magnetization preparation module setting module, a first dataset acquisition module, a second dataset acquisition module, and a signal saturation module.

The magnetization preparation module setting module is configured to set a corresponding magnetization preparation module based on a distance between a target saturation region and a surface coil under a non-uniform field.

The first dataset acquisition module is configured to transmit, by the surface coil, a first main pulse sequence, or sequentially transmit a first magnetization preparation module and a first main pulse sequence, to acquire a first echo signal, and storing the first echo signal as a first dataset.

The second dataset acquisition module is configured to sequentially transmit, by the surface coil, a second magnetization preparation module and a second main pulse sequence to acquire a second echo signal, and store the second echo signal as a second dataset.

The signal saturation module is configured to process the first dataset and the second dataset to saturate a signal in the target saturation region, thereby achieving spatial selection.

The working process, working detail and technical effect of the apparatus provided by the second aspect of the embodiment may refer to the method in the first aspect or any possible implementation of the first aspect, and will not be repeated herein.

A second aspect provides a storage medium. The storage medium is configured to store an instruction; and the instruction is run on a computer to implement the signal saturation method for achieving spatial selection under a non-uniform field in any possible design of the first aspect.

The computer-readable storage medium refers to a carrier that stores data, which may include, but is not limited to, a floppy disk, an optical disk, a hard disk, a flash memory, a USB flash drive, and/or a memory stick. The computer may be a general-purpose computer, a dedicated computer, a computer network, or another programmable device.

The working process, working detail, and technical effect of the computer-readable storage medium provided by the third aspect of the embodiment may refer to the method in the first aspect or in any possible design of the first aspect, and will not be repeated here.

A fourth aspect of the present disclosure provides a computer device, including a memory, a processor, and a transceiver that are sequentially connected in communication, where the memory is configured to store a computer program; the transceiver is configured to transmit and receive messages; and the processor is configured to read the computer program so as to implement the signal saturation method for achieving spatial selection under a non-uniform field in any possible design of the first aspect.

Specifically, for example, the memory may include, but is not limited to, a random-access memory (RAM), a read-only memory (ROM), a flash memory, a first input first output (FIFO) and/or a first input last output (FILO), etc. The processor may be, but is not limited to, an STM32F105-series microprocessor. The transceiver may be, but is not limited to, a wireless fidelity (WiFi) wireless transceiver, a Bluetooth wireless transceiver, a general packet radio service (GPRS) wireless transceiver and/or a ZigBee (a low power local area network protocol based on an IEEE802.15.4 standard) wireless transceiver, etc. In addition, the computer device may further include, but is not limited to, a power module, a display screen and other necessary components.

The working process, working detail and technical effect of the computer device provided by the fourth aspect of the embodiment may refer to the method in the first aspect or any possible implementation of the first aspect, and will not be repeated herein.

Finally, it should be noted that the above described are only preferred embodiments of the present disclosure and are not intended to limit the present disclosure. Any modification, equivalent substitution, improvement, etc. within the spirit and principles of the present disclosure shall fall within the scope of protection of the present disclosure.

What is claimed is:

1. A signal saturation method for achieving spatial selection under a non-uniform field, comprising following steps:
setting a corresponding magnetization preparation module based on a distance between a target saturation region and a surface coil under a non-uniform field;
transmitting, by the surface coil, a first main pulse sequence, or sequentially transmitting a first magnetization preparation module and a first main pulse sequence, to acquire a first echo signal, and storing the first echo signal as a first dataset;
sequentially transmitting, by the surface coil, a second magnetization preparation module and a second main pulse sequence to acquire a second echo signal, and storing the second echo signal as a second dataset; and
processing the first dataset and the second dataset to saturate a signal in the target saturation region to achieve the spatial selection, wherein the step of processing the first dataset and the second dataset to saturate the signal in the target saturation region to achieve the spatial selection comprises:
performing, according to a corresponding synthetic calculation equation, data synthetic calculation on the first dataset and the second dataset to saturate the signal in the target saturation region to achieve the spatial selection, wherein the synthetic calculation equation at least comprises:

$$S_{sync} = wS_1 + S_2, \text{ or} \quad (5)$$

$$S_{sync} = wS_1 - S_2 \quad (6)$$

wherein $S_{sync}$ denotes synthesized data; $S_1$ denotes the first dataset; $S_2$ denotes the second dataset; and W denotes a weighting coefficient, and
wherein the weighting coefficient W is obtained by:
placing a phantom with a same thickness as the target saturation region in the target saturation region as an experimental subject;
scanning the experimental subject separately through the first main pulse sequence, the first magnetization preparation module and the first main pulse sequence, and the second magnetization preparation module and the second main pulse sequence to obtain a first test set and a second test set; and
calculating, based on the first test set and the second test set, the weighting coefficient W as follows:

$$\min_w wS'_1 + S'_2 \quad (7)$$

wherein $S'_1$ denotes the first test set; and $S'_2$ denotes the second test set.

2. The signal saturation method for achieving the spatial selection under the non-uniform field according to claim 1, wherein when transmitting, by the surface coil, the first main pulse sequence, or sequentially transmitting the first magnetization preparation module and the first main pulse sequence, the signal saturation method further comprises:
performing phase cycling on the first main pulse sequence or on the first magnetization preparation module and the first main pulse sequence, to eliminate an effect of a ring-down signal during an echo process and residual transverse magnetization subsequent to the first magnetization preparation module on the first echo signal.

3. The signal saturation method for achieving the spatial selection under the non-uniform field according to claim 1, wherein when sequentially transmitting, by the surface coil, the second magnetization preparation module and the second main pulse sequence, the signal saturation method further comprises:
performing phase cycling on the second magnetization preparation module and the second main pulse sequence, to eliminate an effect of a ring-down signal during an echo process and residual transverse magnetization subsequent to the second magnetization preparation module on the second echo signal.

4. The signal saturation method for achieving the spatial selection under the non-uniform field according to claim 1, wherein the surface coil comprises a main transmit coil and/or a secondary transmit coil; and the surface coil is configured to synchronously or asynchronously transmit the magnetization preparation module through the main transmit coil and/or the secondary transmit coil.

5. The signal saturation method for achieving the spatial selection under the non-uniform field according to claim 1, wherein the magnetization preparation module comprises at least one adiabatic pulse.

6. The signal saturation method for achieving the spatial selection under the non-uniform field according to claim 5, wherein the at least one adiabatic pulse is a 180° adiabatic pulse; and the 180° adiabatic pulse comprises a hyperbolic secant (sech) adiabatic pulse or a wideband, uniform rate, smooth truncation (WURST) adiabatic pulse.

7. A non-transitory storage medium, wherein the storage medium is configured to store an instruction; and the instruction is run on a computer to implement the signal saturation method for achieving the spatial selection under the non-uniform field according to claim 1.

8. The non-transitory storage medium according to claim 7, wherein in the signal saturation method, when transmitting, by the surface coil, the first main pulse sequence, or sequentially transmitting the first magnetization preparation module and the first main pulse sequence, the signal saturation method further comprises:
performing phase cycling on the first main pulse sequence or on the first magnetization preparation module and the first main pulse sequence, to eliminate an effect of a ring-down signal during an echo process and residual transverse magnetization subsequent to the first magnetization preparation module on the first echo signal.

9. The non-transitory storage medium according to claim 7, wherein in the signal saturation method, when sequentially transmitting, by the surface coil, the second magnetization preparation module and the second main pulse sequence, the signal saturation method further comprises:
performing phase cycling on the second magnetization preparation module and the second main pulse sequence, to eliminate an effect of a ring-down signal during an echo process and residual transverse magnetization subsequent to the second magnetization preparation module on the second echo signal.

10. The non-transitory storage medium according to claim 7, wherein in the signal saturation method, the surface coil comprises a main transmit coil and/or a secondary transmit coil; and the surface coil is configured to synchronously or asynchronously transmit the magnetization preparation module through the main transmit coil and/or the secondary transmit coil.

11. The non-transitory storage medium according to claim 7, wherein in the signal saturation method, the magnetization preparation module comprises at least one adiabatic pulse.

12. The non-transitory storage medium according to claim 11, wherein in the signal saturation method, the at least one adiabatic pulse is a 180° adiabatic pulse; and the 180° adiabatic pulse comprises a hyperbolic secant (sech) adiabatic pulse or a wideband, uniform rate, smooth truncation (WURST) adiabatic pulse.

13. The non-transitory storage medium according to claim 7, wherein in the signal saturation method, the step of processing the first dataset and the second dataset to saturate the signal in the target saturation region to achieve the spatial selection comprises:

performing, according to a corresponding synthetic calculation equation, data synthetic calculation on the first dataset and the second dataset to saturate the signal in the target saturation region to achieve the spatial selection, wherein the synthetic calculation equation at least comprises:

$$S_{sync} = wS_1 + S_2, \text{ or} \tag{5}$$

$$S_{sync} = wS_1 - S_2 \tag{6}$$

wherein $S_{sync}$ denotes synthesized data; $S_1$ denotes the first dataset; $S_2$ denotes the second dataset; and W denotes a weighting coefficient.

14. The non-transitory storage medium according to claim 13, wherein in the signal saturation method, the weighting coefficient W is obtained by:

placing a phantom with a same thickness as the target saturation region in the target saturation region as an experimental subject;

scanning the experimental subject separately through the first main pulse sequence, the first magnetization preparation module and the first main pulse sequence, and the second magnetization preparation module and the second main pulse sequence to obtain a first test set and a second test set; and calculating, based on the first test set and the second test set, the weighting coefficient W as follows:

$$\min_w wS'_1 + S'_2 \tag{7}$$

wherein $S'_1$ denotes the first test set; and $S'_2$ denotes the second test set.

* * * * *